July 23, 1929.    O. WERSEN    1,721,580
SECTIONAL REPAIR BAG
Filed April 20, 1925
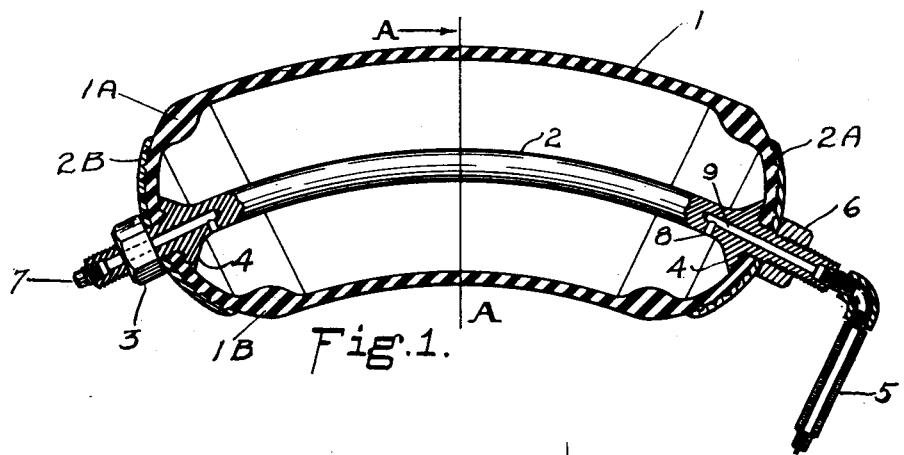
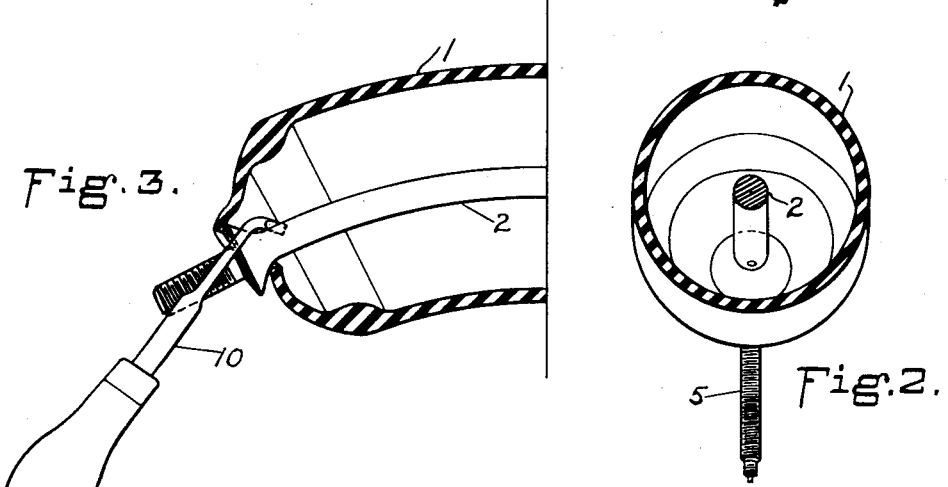
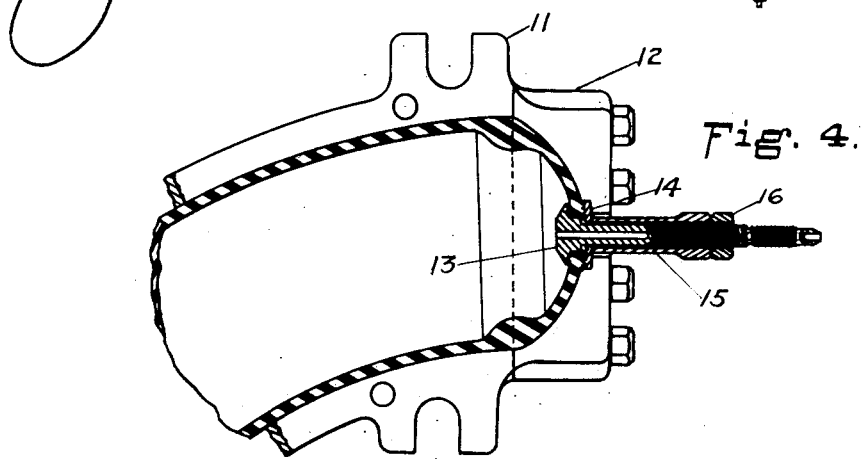
INVENTOR
Oscar Wersen
BY
ATTORNEY Patented July 23, 1929.

1,721,580

UNITED STATES PATENT OFFICE.

OSCAR WERSEN, OF DETROIT, MICHIGAN, ASSIGNOR TO MORGAN & WRIGHT, OF DETROIT, MICHIGAN, A CORPORATION OF MICHIGAN.

SECTIONAL REPAIR BAG.

Application filed April 20, 1925. Serial No. 24,336.

This invention relates to an improvement in sectional repair bags for vulcanizing tires.

Heretofore sectional repair bags or air bags have been employed in vulcanizing pneumatic tires, more particularly in vulcanizing repaired damaged sections of such tires. The customary repair bag is a slightly expansible rubberized fabric bag which is adapted to be distended by a gas or a liquid. When the bag is in place in the tire in question it furnishes considerable pressure against the part which has been repaired. A disadvantage of the existing types of repair bags is that they are not sufficiently expansible to permit their use with a wide range of tire sizes. On the other hand to secure sufficient expansion, it has been proposed to weaken the construction of the bag, which results in a reduction of its period of usefulness.

The present invention has for its object the preparation of a repair bag which has a high degree of radial expansion, and substantially no longitudinal expansion. Another object of the invention is to furnish a more flexible means of maintaining pressure against the repaired portion of a tire carcass than can be accomplished with a bag made of rubberized fabric. Still another object of the invention is to provide a repair bag which can be employed in tires which vary considerably in cross-sectional measurement, at the same time guaranteeing that all portions of the section under repair shall have an adequate amount of pressure. A further object of the invention is to provide a repair bag whose initial cost and whose maintenance cost are much lower than the ordinary type of repair bag. Another object of the invention is to provide a repair bag which readily conforms to the longitudinal and radial curvatures of tires.

Having a preferred illustration in mind but not desiring to place undue limitation upon its scope, the invention consists in the preparation of a sectional repair bag comprising a radially expansible all-rubber bag portion confined against longitudinal expansion by a retaining rod, the ends of which are fitted with coacting flanges adapted to grip between them the ends of the bag tightly. The invention also includes the insertion of means for inflating the bag after it has been placed in the tire.

The sectional repair bag is illustrated in the accompanying drawing, in which:

Figure 1 represents a longitudinal cross-section of the assembled bag;

Fig. 2 is a transverse section of Fig. 1 at the line indicated in Fig. 1 as A—A;

Fig. 3 represents the method of assembling the repair bag, and

Fig. 4 shows a longitudinal cross-section through part of the mold in which the rubber bag is initially vulcanized.

Referring to Fig. 1, the inflatable all-rubber composition body portion is designated as 1, the retaining rod which prevents longitudinal expansion is shown as 2. The lock nuts 3 and 6 hold semi-spherical flanges 2A and 2B against coacting flanges 4 whereby the ends of the bag are firmly held in place. An ordinary check valve 5 is shown attached to the retaining rod 2, and communicating passages 8 and 9 are provided for the introduction of the inflation medium. 7 represents a plug closing a communicating passage which may if desired be used for inflation, by simply replacing the plug 7 with a valve 5. As additional means for preventing undue distortion of the repair bag, thickened portions 1A and 1B serving as stiffening means may be provided at the points where the end curvature of the body portion 1 starts.

In Fig. 2 which is a cross section of Fig. 1, at the line A—A, the all rubber body portion is denoted as 1, the retaining rod as 2, and the inflating valve as 5.

In Fig. 3 is shown the method of assembling the body portion 1 on the retaining rod 2. A tool 10 is used to force the body portion 1 over the retaining rod 2.

Fig. 4 shows the method of curing the body portion prior to its assembly into the finished repair bag. A mold 11 having a removable head 12 is used as an external confining means for vulcanizing the bag. A stem is used consisting of a flanged body portion 13, a washer 14 and a threaded sleeve 15 for securing the bag between the washer 14 and the flange 13. The sleeve 15 is held in place by a lock nut 16. The stem does not contain a valve, but is connected with a source of pressure, preferably air or gas, under approximately 100–150 lbs. pressure throughout the curing operation. After vulcanization and removal of the bag from the mold, the stem 13 is detached from the bag and a hole of the same diameter is punched in the opposite end of the bag. This cured bag is then forced over the retaining rod 2 by means of the tool 10 and the assembly is then completed as shown in Fig. 1. In a modification (not shown) of the repair bag above described, the retaining rod 2 may be jointed or hinged in order to insure wider range of adjustment of the bag for tires of different curvature.

With the construction above illustrated and described, it is possible to use this air bag in tires of varying cross section, which is a factor of extreme importance in the repairing of balloon tires where the cross sectional measurement is subject to wide variation among the several makes of balloon tires now on the market. The bag portion being composed entirely of rubber, possesses a much higher capacity to expand than do bags composed of rubberized fabric or of rubber confined in fabric casings. The walls of the all-rubber bag herein described are of sufficient thickness to permit the desired radial expansion without impairing the strength of the bag. The bag, when used in the customary manner of setting in place and inflating, completely fills the section wherein it is located, and by virtue of the inflation applies adequate pressure to the part or parts being repaired.

A further advantage of the above described bag is that its replacement is considerably cheaper than is the replacement of bags of the ordinary type, for it is only necessary to obtain a new body portion, which can be placed on the retaining rod by the user of the bag. It is not necessary to purchase a complete new bag to replace one which has been worn out. The economy of purchasing only the rubber portion of the repair bag is considerable.

Having thus described my invention, what I claim and desire to protect by Letters Patent is:

1. A sectional repair bag comprising a substantially tubular body having end and side walls, the side walls being of all rubber composition unrestricted by fabric or other textile elements, and the end walls being reinforced, the walls of said bag being thickened at the parts subjected to the greatest strain to prevent rupture due to the pressure within the bag during the vulcanizing operation.

2. A sectional repair bag comprising a body portion having end walls and elastic side walls and a retaining rod extending longitudinally through the body portion, flanges carried thereby adapted to grip a portion of each of the end walls of said body portion, stiffening means integral with the end walls of the bag and extending from the flanges to the side walls for preventing distortion of the end walls, said retaining rod being provided with a passageway communicating with the interior of said body portion whereby the same can be inflated.

3. A sectional repair bag comprising a body portion having side walls which are freely radially expansible and integral end walls, a retaining rod longitudinally disposed within the body portion, flanges carried by the rod adapted to grip the end walls of the body portion to prevent longitudinal expansion of a portion thereof, said end walls being thickened intermediate the side walls and flanges, said retaining rod being provided with a passageway extending into the interior of said body portion whereby the same can be inflated.

Signed at Detroit, county of Wayne, State of Michigan, this 3rd day of April, 1925.

OSCAR WERSEN.